(12) United States Patent
Stevenson (10) Patent No.: US 9,689,513 B2
(45) Date of Patent: Jun. 27, 2017

(54) TUBULAR BODIES AND METHODS OF FORMING SAME

(71) Applicant: ITI Scotland Limited, Strathclyde (GB)

(72) Inventor: Andrew Stevenson, Hertfordshire (GB)

(73) Assignee: ITI SCOTLAND LIMITED, Strathclyde (GB)

( * ) Notice: Subject to any disclaimer, the term of this patent is extended or adjusted under 35 U.S.C. 154(b) by 55 days.

(21) Appl. No.: 14/355,483

(22) PCT Filed: Oct. 31, 2012

(86) PCT No.: PCT/GB2012/052719
§ 371 (c)(1),
(2) Date: Apr. 30, 2014

(87) PCT Pub. No.: WO2013/064827
PCT Pub. Date: May 10, 2013

(65) Prior Publication Data
US 2014/0318663 A1    Oct. 30, 2014

(30) Foreign Application Priority Data
Nov. 1, 2011 (GB) .................................. 1118846.3

(51) Int. Cl.
*F16L 9/16* (2006.01)
*F16L 11/00* (2006.01)
(Continued)

(52) U.S. Cl.
CPC ............... *F16L 11/16* (2013.01); *F16L 9/045* (2013.01); *Y10T 29/49826* (2015.01)

(58) Field of Classification Search
CPC ...................................................... F16L 11/16
(Continued)

(56) References Cited

U.S. PATENT DOCUMENTS 3,674,056 A * 7/1972 D'Aprile ................. F16L 11/16
138/129
4,196,755 A * 4/1980 Kutnyak ................. F16L 11/112
138/122

(Continued)

FOREIGN PATENT DOCUMENTS

CA           2624190 A     3/2004
DE     102009043932 A1    3/2011
(Continued)

OTHER PUBLICATIONS

Search Report for corresponding GB Appl. No. 1118846.3 dated Feb. 27, 2012.

(Continued)

*Primary Examiner* — Vishal Pancholi
(74) *Attorney, Agent, or Firm* — MH2 Technology Law Group, LLP (57) ABSTRACT

The present invention provides a tubular article (10), such as may be used as an oil and gas pipeline, having a longitudinal axis X comprising inner and outer separate strips (12, 14) of spirally wound overlapping material each having a longitudinal axis L and first and second edges (16, 18, 16', 18'), in which each strip (12, 14) comprises two or more longitudinally extending ridges (20, 22, 20', 22'), each of which extends along said longitudinally extending axis L in parallel to each other and in which said ridges (20, 22, 20', 22') each comprise asymmetric ridges having a leading edge (24, 24') forming a contact portion (28, 28') and wherein said leading edges (24, 24') are each in contact with each other and further comprising a non-contact trailing edge portion (26, 26') which are spaced from each other by an amount G.

23 Claims, 7 Drawing Sheets

(51) Int. Cl.
*F16L 11/16* (2006.01)
*F16L 9/04* (2006.01)

(58) Field of Classification Search
USPC .............................. 138/122, 129, 130, 135
See application file for complete search history.

(56) References Cited

U.S. PATENT DOCUMENTS

| | | | |
|---|---|---|---|
| 5,117,874 A * | 6/1992 | Ochiai et al. | 138/140 |
| 5,730,188 A | 3/1998 | Kalman et al. | |
| 5,954,096 A * | 9/1999 | Lepoutre | 138/129 |
| 6,024,134 A * | 2/2000 | Akedo et al. | 138/129 |
| 6,024,135 A * | 2/2000 | Nobileau | 138/134 |
| 6,347,646 B2 * | 2/2002 | Fukui et al. | 138/129 |
| 6,378,561 B1 * | 4/2002 | Thomas | F16L 11/16 138/135 |
| 6,659,136 B2 * | 12/2003 | Fukui et al. | 138/125 |
| 7,766,050 B2 * | 8/2010 | Patel | 138/129 |
| 7,971,610 B2 * | 7/2011 | Booth et al. | 138/131 |
| 2011/0000573 A1 * | 1/2011 | Booth | 138/154 |

FOREIGN PATENT DOCUMENTS

| | | |
|---|---|---|
| EP | 0104842 A2 | 4/1984 |
| EP | 0222285 A2 | 5/1987 |
| GB | 2280889 A | 2/1995 |
| GB | 2433453 A | 6/2007 |
| GB | 2456225 A | 7/2009 |
| WO | 0036324 A1 | 6/2000 |

OTHER PUBLICATIONS

International Search Report and Written Opinion for PCT/GB2012/052719 mailed Mar. 18, 2013.

\* cited by examiner

TUBULAR BODIES AND METHODS OF FORMING SAME

CROSS-REFERENCE TO RELATED APPLICATIONS

This application is a United States national phase application under 35 U.S.C. §371 of International Patent Application No. PCT/GB2012/052719 filed on Oct. 31, 2012, and claims the benefit of Great Britain Patent Application No. 1118846.3 filed on Nov. 1, 2011, both of which are herein incorporated in their entirety by reference. The International Application was published as International Publication No. WO 2013/064827 on May 10, 2013.

FIELD

This invention relates to a tubular bodies and methods of forming same, and relates more particularly but not exclusively to the production of pipes for use in systems such as pipelines for carrying hydrocarbon, gas or liquid products under pressure.

DISCUSSION OF THE PRIOR ART

Presently, it is well known to form pipelines from sections of pipe which have each been roll formed into tubular structures from flat strip or plate and seam welded in a pipe mill before being butt welded to each other in the field to form the finished pipeline. The viability of such pipes is limited by the economics of the materials being used and the weight of the final product which must be transported and moved into position, often in very difficult circumstances as well as the issues of final assembly. Final assembly typically requires a welding team of up to thirty welders to manually weld fixed segments of pipeline together and a support team of up to two hundred people is often needed in addition. The logistics associated with moving and caring for such large numbers of people in what can often be very remote locations can be prohibitively expensive and complex. Still further, such pipes are inherently rigid and straight and navigation of even undulating terrain usually requires specific bend stations which force bends of up to 40x the pipeline diameter into rigid sections and return them for welding into the pipe line. This is a manual process which has not changed for 75 years. The context of the process proposed here is that it is suitable for automation and reduces or eliminates the need for bend stations.

Figure 1:
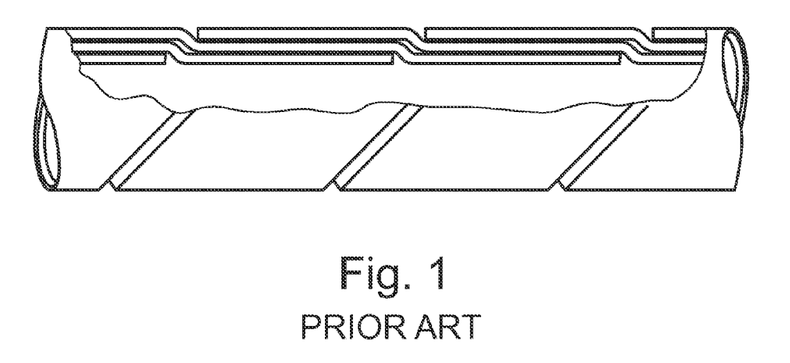
FIGS. 1 and 2 are illustrative of the prior art tubular bodies.
Figure 2:
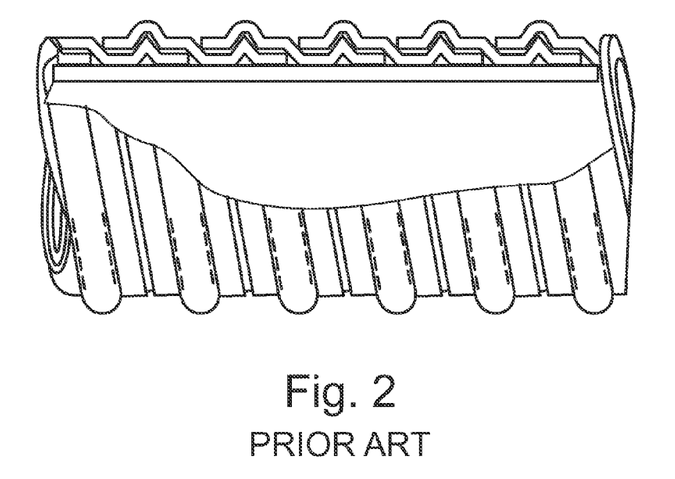

GB2280889 discloses a method of forming a hollow elongated or tubular body and comprises helically winding at least one strip of material in self-overlapping fashion to provide a multi-layer tubular structure. In this arrangement the strip is pre-formed to provide a transverse cross-section having at least one step which, in each convolution of the strip accommodates the overlapping portion of the next convolution. A tubular body having a wall thickness formed of a plurality of laps may thus be continuously made from a single strip of material, the wall thickness generally being one strip thickness greater than the number of steps formed in the cross-section of the strip. Such an arrangement is shown in FIG. 1 attached hereto. Such a design may also be provided with circumferentially extending ridges formed by plastically deforming the cross-sectional profile of the strip before it is wound and such ridges overlap and nest within each other such as to provide an inter-lock which resists both axial and circumferential loads placed on the finished structure.

The above arrangement may be provided with an internal liner, the form of which will depend upon the application for which the tubular structure is intended but may comprise a roll-form and seam-welded tubular member. In the fabrication of such a tubular structure, the inner liner may be pre-formed so as to provide a mandrel or core upon which the helically wound reinforcing strip is wound.

GB2433453 discloses a manufacturing step associated with the type of tubular structure disclosed in GB 2280889 which causes the reinforcing strip itself to be plastically deformed to a diameter slightly smaller than that of the core or liner onto which it is to be wound such that the strip is, effectively, self locating and places the core under a small amount of pressure but not enough to cause buckling.

Both the above designs must process the reinforcing strip such as to accommodate the variation in diameter that the strip has between the inner diameter and the outer diameter. This processing can be problematic and may induce undesirable stresses in the material. In addition, the nature of the overlapping ridges used in the above arrangements complicates the accurate location and inter-locking of the ridges. An additional manufacturing step is required in order to cause the variation in diameter required and this introduces additional residual strain into the material which may be undesirable and may use up an unacceptable proportion of the relatively limited ductility available in high strength materials, such as high tensile steel.

Whilst both the above arrangements provide acceptable solutions to the problem of manufacturing tubular structures, a further improvement has now been found that lends itself to the production of such tubular structures and it is to this improvement that the present application is directed.

SUMMARY OF THE PRESENT INVENTION

Accordingly, the present invention provides a tubular article having a longitudinal axis X comprising inner and outer separate strips of spirally wound overlapping material each having a longitudinal axis L and first and second edges, characterised in that each strip comprises two or more longitudinally extending ridges, each of which extends along said longitudinally extending axis L in parallel to each other and in which said ridges each comprise asymmetric ridges having a leading edge forming a contact portion and wherein said leading edges are each in contact with each other and further comprising a non-contact trailing edge portion which are spaced from each other by an amount G.

Preferably, said contact portion comprises a portion of said ridge extending at an angle θ' relative to said longitudinal axis X and in that said trailing edge portions extend at an angle θ" relative to said longitudinal axis X and wherein said angle θ" is greater than said angle θ'.

Advantageously, said angle θ" is greater than said angle θ' by 20 degrees or more.

In one arrangement, said contact portion comprises a portion of said ridge extending at an angle θ' of between 70 degrees to 110 degrees relative to said longitudinal axis X.

Alternatively, said contact portion comprises a portion of said ridge extending substantially perpendicular to said longitudinal axis X.

Advantageously, said trailing edge portions extend at an angle θ" of between 20 degrees and 70 degrees relative to said longitudinal axis X.

Preferably, said trailing edge portions extend at an angle θ" of substantially 45 degrees to said longitudinal axis X.

In one arrangement, said leading edge of said outer strip each face away from each other.

In one arrangement, said leading edge of said inner strip each face towards each other. It will be appreciated that one could reverse the above such that the said leading edge of said outer strip each face towards each other and the leading edge of said inner strip each face away from each other.

Preferably, the arrangement includes an inner gap G between adjacent inner strip edges.

Advantageously, the arrangement includes a gap G2 between adjacent outer strip edges.

Preferably, the inner gap G lies at a position between the outer ridges.

Advantageously, said outer gap G2 lies at a position between the inner ridges.

Preferably, said article includes an inner core around which said inner and outer strips are wound.

Advantageously, said inner and outer strips have a natural radius of curvature R, R' less than the radius R" of the outer portion of the inner core.

In a typical arrangement, said inner and outer strips comprise material having a tensile strength of between 800 and 2000 GPa.

Preferably, said strips are each wound at an angle θ to said longitudinal axis X. In one arrangement said angle θ is between 4 and 54 degrees, whilst in another said angle θ is between 4 and 12 degrees. In a particular arrangement, said angle θ is substantially 12 degrees.

According to another aspect of the present invention, there is provided a method of manufacturing a tubular article having a longitudinal axis X comprising providing inner and outer strips characterised by the steps of forming the pair or longitudinally extending ridges, on said strip, each of said ridges being formed such as to extends along said longitudinally extending axis L in parallel to each other and forming said ridges as asymmetric ridges having a leading edge forming a contact portion and wherein said strips are wound in spirally wound overlapping relationship such that leading edges thereof are each in contact with each other and said trailing edge portions are wound such as to be distanced from each other by an amount G.

According to a further aspect of the present invention there is provided a tubular strip for manufacture of a tubular article according to any one of claims 1 to 14 comprising a pair or longitudinally extending ridges, each of which extends along said longitudinally extending axis L in parallel to each other and in which said ridges each comprise asymmetric ridges having a leading edge forming a contact portion and further comprising a non-contact trailing edge portion.

BRIEF DESCRIPTION OF THE DRAWINGS

The present invention will now be more particularly described by way of example only with reference to the accompanying drawings, in which.

DETAILED DESCRIPTION OF THE PRESENT INVENTION

Figure 3:
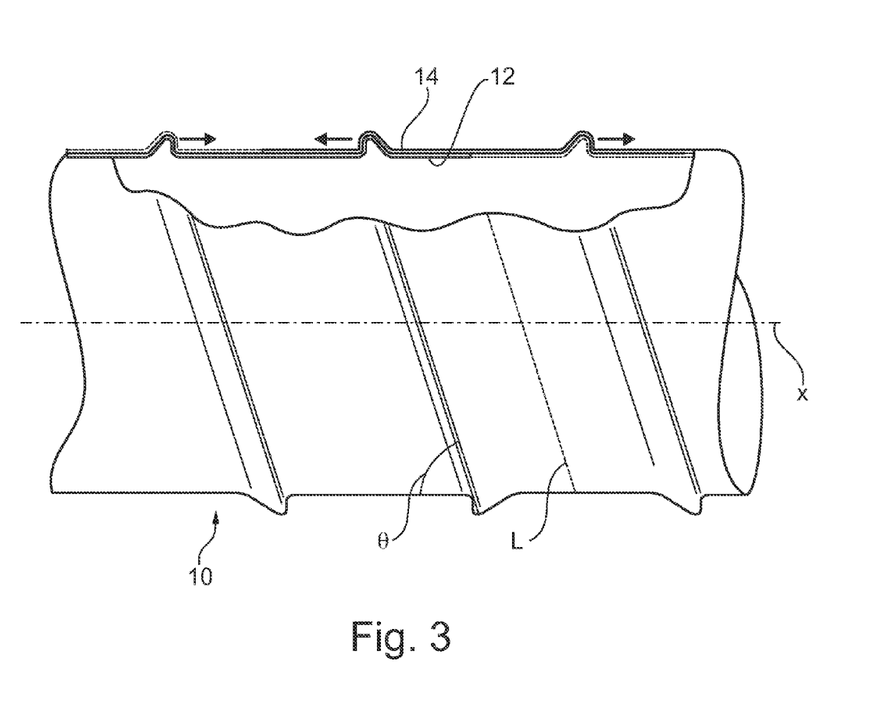
FIG. 3 is a partially cut-away view of the tubular body according to the present invention.
Figure 4:
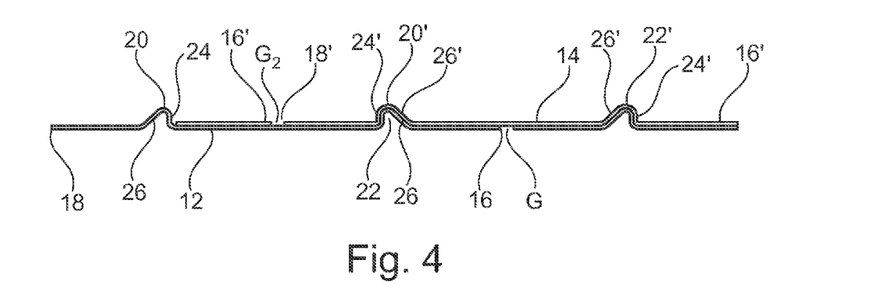
FIG. 4 is a cross-sectional view of an overlapping portion of the tubular body of FIG. 3.
Figure 5:
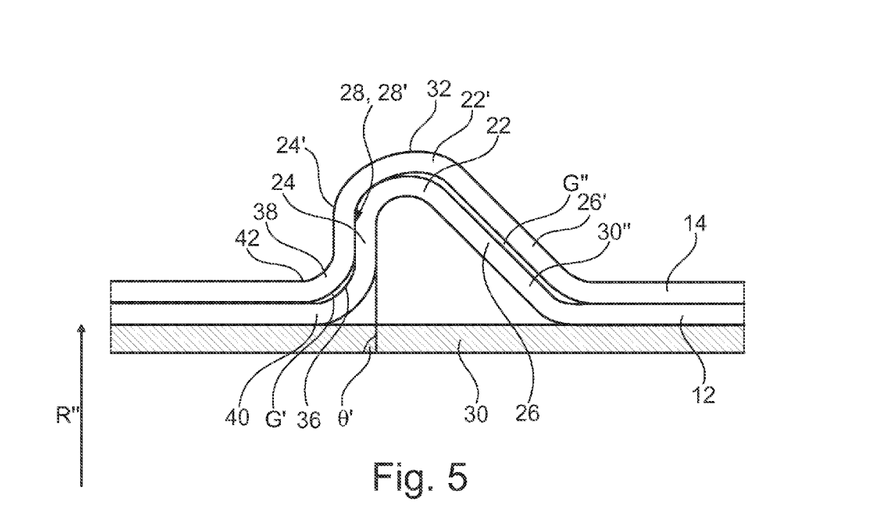
FIG. 5 is an expanded view of a ridge portion of FIG. 4 and illustrates in detail the inter-relationship between the inner and outer ridges.

Referring now to the drawings in general but more particularly to FIGS. 3 to 5, the present invention comprises a tubular structure 10 having a longitudinal axis X and comprising inner and outer strips 12, 14 respectively. The strips 12, 14 each have a longitudinal axis L and include first and second edges 16, 18, 16', 18' and are each spirally wound around axis X at an angle θ relative to the longitudinal axis X. Each strip 12, 14 comprises a pair of longitudinally extending ridges 20, 22, 20', 22', each of which extends along said longitudinal axis L in parallel to each other. In stark contrast with the prior art described above, each of the ridges comprise asymmetric ridges having a leading edge 24, 24' and a trailing edge 26, 26' where the leading edge(s) form a contact portion 28, 28' which are in contact with each other and a non-contact trailing edge portion 30, 30' which are spaced from each other by an amount G. The advantages associated with this arrangement will be explained later herein with reference to FIG. 5. The contact portion(s) 28, 28' comprises a portion of the ridges 12, 14, each of which extend at an angle θ' relative to said longitudinal axis X and the trailing edge portions 26, 26" extend at an angle θ" relative so said longitudinal axis X and angle θ" is greater than angle θ'. Preferably θ" is greater than θ' by an amount equal to or greater than 20 degrees. In the arrangement of the present invention it will be possible to vary the angle θ' between 70 degrees and 110 degrees and possibly more depending on the degree of friction that exists between the two portions. What is most important is that the contact portions 28, 28' remain in contact with each other when axial load is placed on the article 10 which may, other than for the existence of the frictional or physical interference relationship at the contact point 28, 28' is such as to ensure the two leading edges remain in contact with each other when the structure 10 is manipulated such as to put a longitudinal strain thereon. The skilled reader will appreciate that the specific angle θ' will vary depending upon the properties of the material and the contact surface but that an angle of 90 degrees will optimise the degree of grip whilst still allowing the strips 12, 14 to be laid over each other. In essence, the preferred angle of θ' is such that the leading edges extend away from the surface of the strip perpendicular (90 degrees) to the longitudinal axis X. The trailing edges 26, 26' extend at an angle θ" relative to the longitudinal axis X and, whilst the specific angle is less important than angle θ', the specific angle θ" chosen depends partially on the degree of bending the strip material can accommodate and partially on the practicality of the amount of space available. In practice, it has been found that an angle of between 20 degrees and 70 degrees relative to axis X is appropriate. In the specific example of the drawings, an angle θ" has been chosen as this gives a good compromise between reduced material damage in bending and a compact ridge design. Other angles will present themselves to those skilled in the art.

With reference to FIGS. 3, 4, 6 and 7, it will be appreciated that the leading edges 24, 24' on each strip can either face towards each other (arrow T) or away from each other (arrow A). In the specific arrangement shown, the leading edges 24 of the inner strip 12 face towards each other whilst the leading edges 24' of the outer strip 14 face away from each other. This arrangement may be reversed such that the leading edges 24 of the inner strip 12 face away from each other whilst the leading edges 24' of the outer strip face towards each other. This reverse arrangement between strips 12, 14 is requires such that the inner and outer strips 12, 14 can be lain one on top of the other in staggered arrangement, as best seen in FIG. 4. From this figure, it will be appreciated that the staggering is equal to one pitch of the ridges 20, 20', 22, 22' such that a right hand RH inner ridge 20 fits under and within a left hand LH outer ridge 22 whilst a left hand LH inner ridge 22 will fit under and within a right hand RH outer ridge 22'. The inner and outer strips 12, 14 are, therefore, to some extent locked to each other by the interaction of the leading edges 24, 24' which are arranged to be in close proximity and preferably in contact with each other once assembled. Indeed, the arrangement may be such as to provide a small interference fit between the two engaging surfaces at the contact portion 28, 28'. The close contact at the contact points 28, 28' mean that any axial load placed on the tubular article in the direction of arrow $A_L$ will be reacted through the contact points 28, 28' which, due to the nature of the contact and the angular relationship θ' will provide a substantially enhanced barrier to flattening of the ridges and, therefore, also to unlocking of the interlock created therebetween. Those skilled in the art will appreciate that for the ridge to slide out from its interlocking partner the strain in the steel must exceed the plastic limit of the material such as to cause flattening of the inner ridge. This advantage provides the present invention with one of the technical improvements over the prior art. Also shown in FIG. 4 is a gap G between edges of adjacent strips which allows for thermal expansion and manufacturing tolerances but which is sized such as to restrict to a minimum the axial distance over which a single layer of reinforcing layers 12, 14 are provided over the core or liner 30, best seen in FIG. 5.

FIG. 5 provides a more detailed cross-sectional view of the ridge section and from which it will be appreciated that the bend radii R and location thereof of both the inner and the outer strips 12, 14 (which are shown in more detail in FIGS. 8 and 9) are preferably selected such as to ensure appropriate gaps G' and G". Gap G" is provided on the trailing edge of the ridge and, preferably, extends from the peak 32 thereof and downwardly along the trailing edge portions 26, 26' themselves. The function of this gap is to provide some degree of flexibility in the finished tubular article itself 10 and, it will be appreciated, that the gap G" may be varied or indeed eliminated altogether if so desired. An arrangement without a gap G" would be more difficult to manufacture but would be more rigid. An arrangement with a greater gap G" would be more easily manufactured as tolerances would be lower but would be more flexible. Either arrangement or something between the two would be appropriate for different arrangements and the present design may be modified to suit the installation and operational requirements for flexibility. Gap G' is provided at the base 34 of the leading edge and provided merely to ensure a spacing between the two layers as they each transition between a substantially longitudinal direction (axis X) and a substantially transverse direction T. Such a gap G' also helps ensure that the two contacting surfaces of the inner and outer layers 12, 14 are placed in contact with each other as soon as possible after they exist their respective initial bends 36, 38 at the base 40, 42 of the leading edges.

Figure 6:
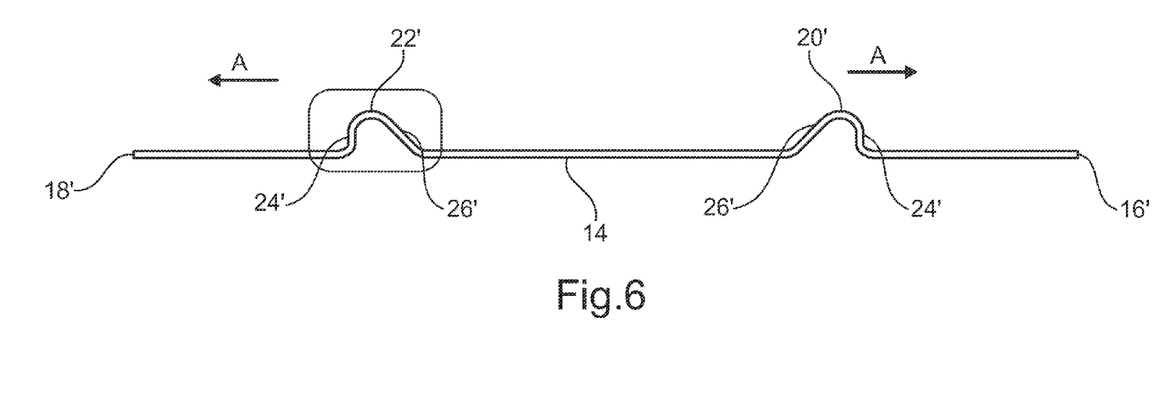
FIG. 6 is a cross-sectional view of the outer layer of strip shown in FIGS. 3 to 5.
Figure 7:
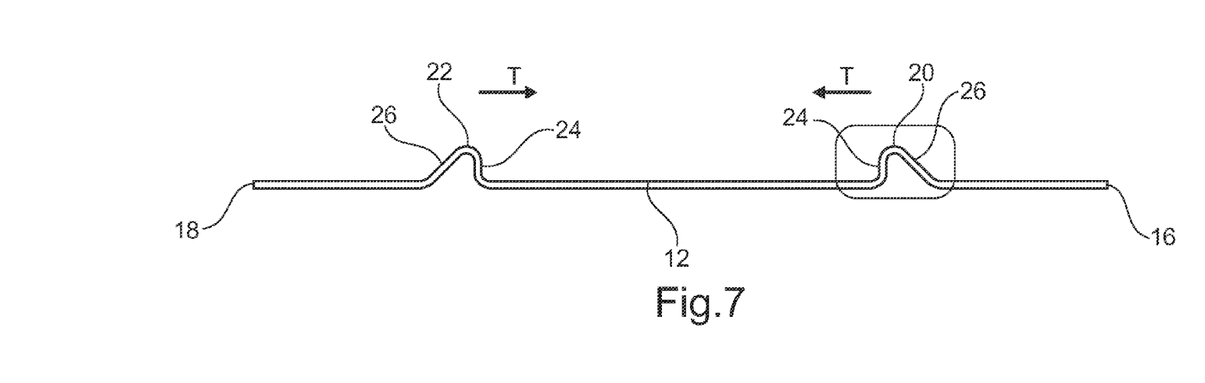
FIG. 7 is a cross-sectional view of the inner layer of strip shown in FIGS. 3 to 5

FIGS. 6 and 7 clearly illustrate the major differences between the inner 12 and outer 14 layers and from which it will further be appreciated that the bend radii R associated with the outer layer 14 must be larger than the bend radii associated with the inner layer such as to ensure the two sit comfortably one within the other. In addition, these figures illustrate very clearly the difference between the directions of orientation of the ridges 24, 24' for each of the inner 12 and outer 14 layers which, when displaced axially along axis X relative to each other by half a strip width will allow each layer to nestle next to each other, as shown, and without an excessive gap being formed therebetween.

Figure 8:
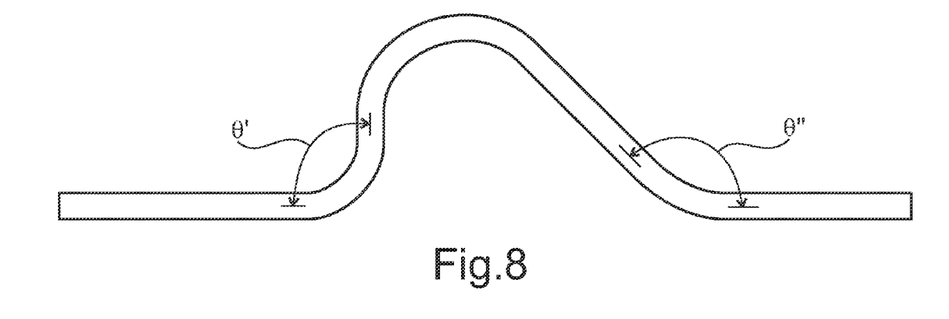
FIGS. 8 and 9 are detailed cross-sectional views of the outer and inner ridges as shown in the above-mentioned figures.
Figure 9:
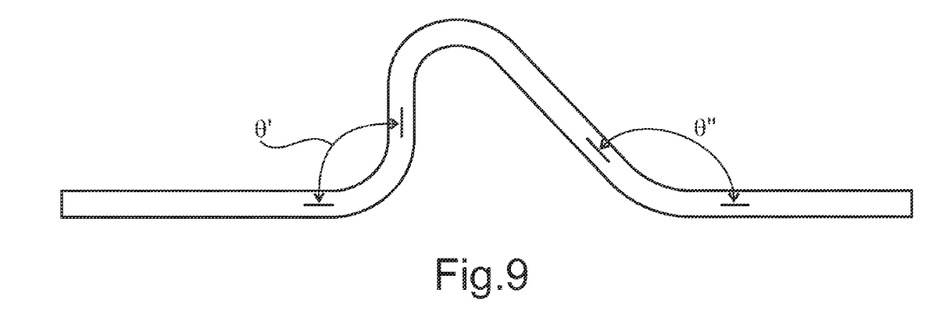

The detail of the bend radii R for typical matched inner and outer layers 12, 14 are shown in detail in FIGS. 8 and 9 and from which it will be appreciated that the bend radii would need to be varied if the thickness T of the respective strips is varied.

Method of Manufacture

The method of manufacturing a tubular article (10) as described above and having a longitudinal axis X comprises the steps of: providing inner and outer strips (12, 14); forming the pair or longitudinally extending ridges (20, 22, 20', 22'), on said strip, each of said ridges being formed such as to extend along said longitudinally extending axis L in parallel to each other and forming said ridges (20, 22, 20', 22') as asymmetric ridges having a leading edge (24, 24') forming a contact portion (28, 28') and winding said strips in spirally wound overlapping relationship such that leading edges (24, 24') thereof are each in contact with each other and said trailing edge portions (26, 26') are wound such as to be distanced from each other by an amount G.

Figure 10:
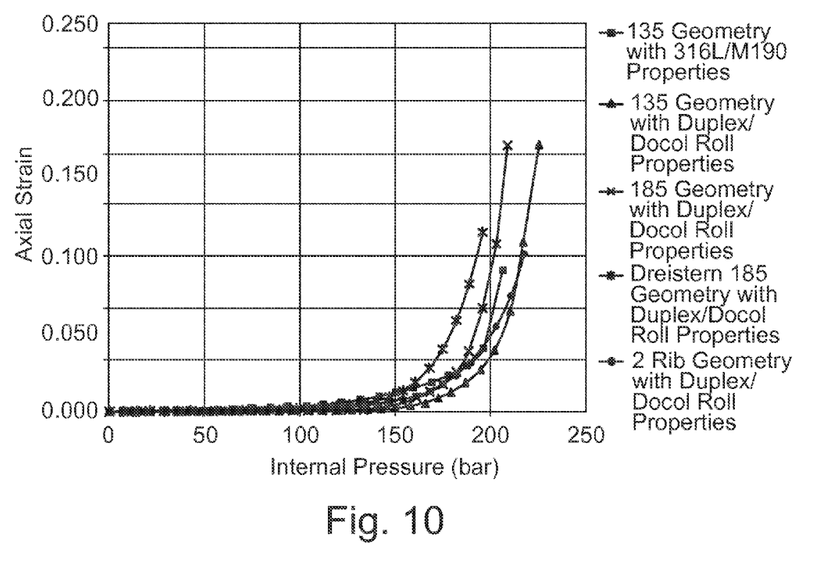
FIG. 10 is a graph of global axial strain against internal pressure for a number of designs, one of which is the present invention.
Figure 11:
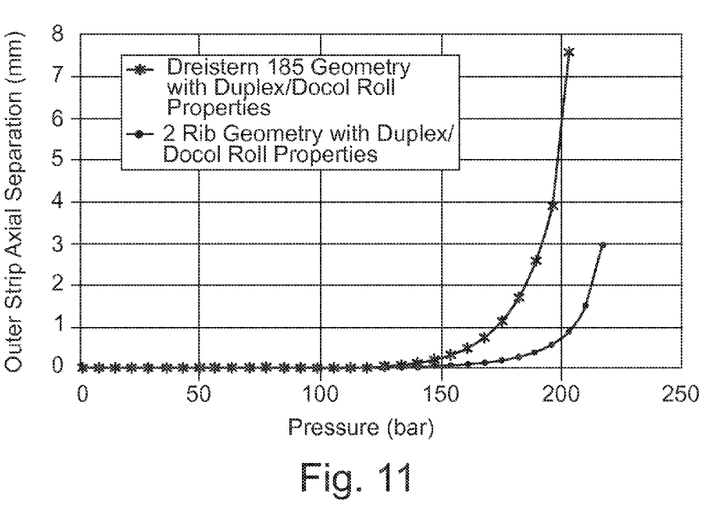
FIG. 11 is a graph of Outer Strip Axial Separation against Pressure for two designs.

FIGS. 10 and 11 provide some comparison between the present invention (2 ridge Geometry with duplex/Docal Roll Properties and a number of other designs. It is desirable that the axial extension or global strain is not too great under internal pressure or it will lead to movement and possibly failure. FIG. 10 compares the new design designated 2-rib with 3 prior art designs 135 and 185 and one design that is not prior art and has two layers but has only a single rib. FIG. 11 compares the single rib or ridge with the 2-rib or ridge design. From these figures it will be appreciated that the new design equals or out-performs many of the prior art arrangements because the extension does not increase under pressure despite the fact that it comprises just two layers whereas the prior art comprises three layers.

The present invention also employs a winding angle θ of up to 30 degrees compared with the prior art arrangement which is typically just 4 degrees. This increase in winding angle alone increases the speed and efficiency of manufacture by a large factor (Three in the case of the preferred configuration where the winding angle is 12 degrees). It is thought feasible that angles of up to 54 degrees may be achievable for certain applications and the present invention is deemed to cover such a range.

The performance of the present invention in comparison with known strip profiles will now be discussed with reference to FIGS. 10 and 11 above and 12 to 14 which disclose the known strip profiles. The present invention provides a 2 ridge geometry with Duplex S32205/Docol Roll and is presented as such in the comparative performance tables and graphs. The comparison is with results for prior art configurations analysed under internal pressure loading.

The two ridge geometry in the example of the present invention consists of two independent strips, helically wound around the liner at 12° approximately, creating a 2 layer strip cross-section. This configuration was analysed with Duplex S32205/Docol Roll properties. Strip thickness is increased to 0.75 mm. A section through the strip arrangement is shown in FIG. 4 attached hereto.

Figure 12:
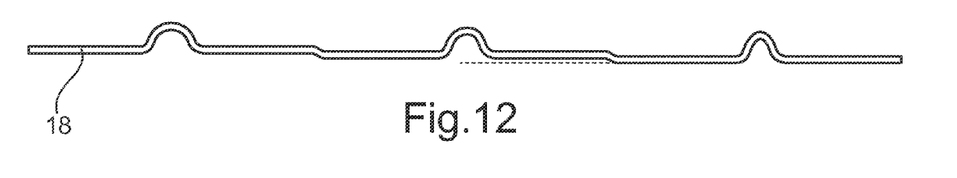
FIGS. 12 to 14 are cross-sectional views of three different strip profiles used in the comparative numerical modelling to characterise behaviour.

The first prior art comparative example is referred to as the 135 geometry and consists of a single strip with 3 symmetric ridges, helically wound around the liner at 4°. The strip is "joggled" twice between the ridges, creating a 3 layer strip cross-section. This concept was analysed with both the 316L/M190 properties and the Duplex S32205/Docol Roll properties. A section through the strip profile is shown in FIG. 12.

Figure 13:
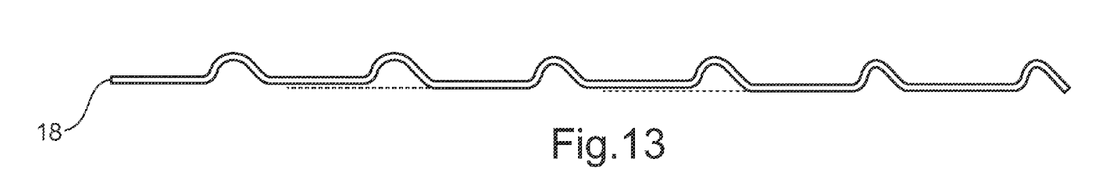

The second comparative example is referred to as the 185 geometry and consists of a single strip with 3 asymmetric ridges, helically wound around the liner at 4°. The strip is "stepped" twice at the ridge locations, creating a 3 layer strip cross-section. This concept was analysed with Duplex S32205/Docol Roll properties. A section through the strip profile is shown in FIG. 13.

Figure 14:
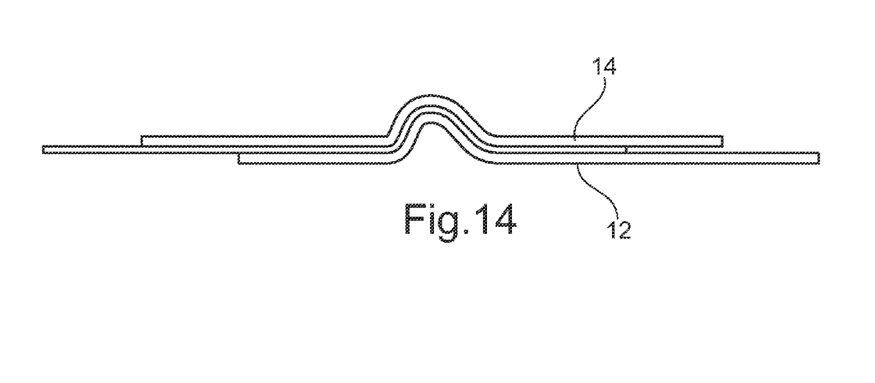

The third comparative example is referred to as the Dreistern 185 geometry and consists of three independent strips, each with a single asymmetric ridge, helically wound at 4° around the liner, creating a three layer strip cross-section. This concept was analysed with Duplex S32205/Docol Roll properties. A section through the strip profile is shown in FIG. 14.

Performance of the Present Invention

Internal pressure and axial load cases have been analysed for the two ridge geometry with Duplex S32205/Docol Roll properties. Results from these analyses have been compared with results previously obtained from 3D analysis under internal pressure loading. A complete list of internal pressure load cases analysed to date is listed in Table 2.1.

TABLE 2.1

Internal Pressure Load Case Studies

| Study | Model | Liner Material | Strip Material/ winding angle |
|---|---|---|---|
| 1 | Self overlapping 135 geometry - 3 ridges | 316 | M190/4° |
| 2 | Self overlapping 135 geometry - 3 ridges | Duplex | D1000/4° |
| 3 | Self overlapping 185 geometry - 3 ridges | Duplex | D1000/4° |
| 4 | Separate layers Dreistern 185 geometry -single ridge | Duplex | D1000/4° |
| 5 | 2 ridge geometry with Duplex/ Docol Roll (present study) | Duplex S32205 | 1000/12° |

The following can be concluded from a comparison of the 2 ridge geometry with Duplex/Docol Roll properties with the previous studies:

For the internal pressure load case, 1% equivalent plastic strain is attained in the strip at 155 bar for the 2 ridge geometry with Duplex S32205/Docol Roll properties. This compares well with previous studies.

Gross plastic strain in the ridges, resulting in flattening and unlocking of strips, occurs for the 2 ridge geometry with Duplex S32205/Docol Roll properties at a pressure of 210 bar. This compares favourably with previous studies.

Under axial loading only, the 2 ridge geometry with Duplex S32205/Docol Roll properties attains 1% equivalent plastic strain at roughly the same load as the equivalent end cap load when internal pressure is also applied. This suggests that failure is due primarily to unlocking under axial loading.

Increased strip winding angle is likely to increase the axial stiffness of the pipe.

In all cases studied, the attainment of 1% equivalent plastic strain occurs in the inner strip layer, at either the top radius of the ridge, or the bottom corner of the ridge.

For the 2 ridge geometry with Duplex S32205/Docol Roll properties and the Dreistern 185 geometry with Duplex S32205/Docol Roll properties (Studies 4 and 5 in Table 2.1), axial separation between layers is more likely to become large as ultimate failure of the pipe is approached. This is because these arrangements use multiple strip layers. Under internal pressure, larger axial separation occurs for the Dreistern 185 geometry with Duplex S32205/Docol Roll properties, due to the lack of ridge interlock in that design. For the present study, loss of interlock is evident at 210 bar approximately. Table 6.1 lists the calculated burst pressures for all previous studies for comparison. This indicates that the present study compares extremely well with previous studies.

TABLE 6.1

Indicated Burst Pressures from All Previous Studies

| Model | Pressure Resulting in Unlocking of Layers (bar) | End Cap Load Resulting in Unlocking of Layers (kN) |
|---|---|---|
| 2 ridge geometry with Duplex S32205/Docol Roll properties (present study) | 210 | 435 |
| 135 geometry with 316L/M190 | 205 | 422 |
| 135 geometry with Duplex S32205/ Docol Roll | 219 | 449 |
| 185 geometry with Duplex S32205/ Docol Roll | 210 | 435 |
| Dreistern 185 geometry with Duplex | 196 | 406 |

A useful indicator for comparison is the internal pressure required to produce 1% equivalent plastic strain (Abaqus output, PEEQ) in the reinforcing strip material, away from boundary effects. Table 6.2 lists the calculated internal pressures required to produce 1% equivalent plastic strain in the strip layers for all the studies to date, along with the associated axial end cap loads. These indicate that the 2 ridge geometry with Duplex S32205/Docol Roll properties compares reasonably well with previous studies.

TABLE 6.2

Internal Pressures Generating 1% PEEQ for All Previous Studies

| Model | Pressure Resulting in | End Cap Load Resulting in | Location of peak |
|---|---|---|---|
| 2 ridge geometry with Duplex | 155 | 317 | Inner strip, bottom corner of ridge |

TABLE 6.2-continued

Internal Pressures Generating 1% PEEQ for All Previous Studies

| Model | Pressure Resulting in | End Cap Load Resulting in | Location of peak |
|---|---|---|---|
| S32205/Docol 135 geometry with 316L/M190 | 150 | 307 | Inner strip, top of ridge |
| 135 geometry with Duplex S32205/Docol Roll | 166 | 340 | Inner strip, top of ridge |
| 185 geometry with Duplex S32205/Docol Roll | 160 | 332 | Inner strip, bottom corner of ridge |
| Dreistern 185 geometry with Duplex S32205/Docol Roll | 176 | 365 | Inner strip, bottom corner of ridge |

NOTE:
The 2 ridge geometry with Duplex S32205/Docol Roll (present study) was wound at a helix angle of 12 degrees whilst the 135 geometry with 316L/M190 was wound at a helix angle of 4 degrees.

Comparison of the global axial strain against internal pressure for each configuration including the present study is illustrated in FIG. 10. The 2 ridge design is at least as good as other configurations in terms of axial stiffness. A higher contribution to the axial resistance from the strip layer due to the increase in winding angle may account for this.

FIG. 11 graphs a comparison of the axial separation between adjacent outer strip layers calculated in the single ridge Dreistern 185 geometry and the 2 ridge geometry under internal pressure. These two configurations are compared since they are the only ones to incorporate multiple independent strip layers. This graph indicates a much larger axial separation between the layers of the Dreistern 185 geometry, due to the lack of ridge interlock. Although a single ridge would reduce manufacturing complexity the extent of separation under single load is considered undesirable. This illustrates the effectiveness of the 2-ridge interlocking invention disclosed here.

Methodology

The 3D analysis of the Helipipe geometry has been performed using the Abaqus general purpose FEA code, version 6·10$^{-1}$ [2]. All load cases are solved quasi-statically using the explicit dynamic solver. The explicit solver allows for all the possible contact interfaces which may arise during analysis to be generated in one single automatic contact definition. The explicit solver also typically has lower memory requirements than the implicit solver as the model size increases.

Advantages of the Present Invention

It will be appreciated that the main advantage associated with the present invention is the elimination of the steps associated with the prior art arrangements and the elimination of the requirement to accommodate the change in diameter of the strip between the inner and the outer diameters thereof. However, in addition to these advantages, it is clear that the present invention achieved very comparable pressure performance without the requirement for the complex self-overlapping arrangement of the prior art. The performance of the present invention was also achieved with a more ductile grade of material than the prior art, as detailed below by reference to published data for commercial grades of high strength steel:

| Commercial Grade | Minimum Tensile Strength Mpa | Minimum Elongation % | Min Bend Radius (for forming) |
|---|---|---|---|
| Ducol 1000DP | 1000 | 7 | 2t |
| M190, Ducol 1400M | 1400 | 3 | 3t |

What is claimed is:

1. A tubular article having a longitudinal axis, wherein the tubular article comprises:
a first inner strip and a second outer strip that are separate from one another, wherein the first inner strip and the second outer strip are each made of spirally wound overlapping material;
wherein the first inner strip has a longitudinal axis, a first edge, and a second edge, the first and second edges of the first inner strip being at a common first radius;
wherein the second outer strip has a longitudinal axis, a first edge, and a second edge, the first and second edges of the second outer strip being at a common second radius;
wherein the first inner strip comprises two or more longitudinally extending inner ridges, each of which extends along the longitudinally extending axis of the first inner strip in parallel to each other and in which the inner ridges of the first inner strip each comprise asymmetric ridges having a leading edge extending from the first radius and forming a contact portion and a non-contact trailing edge portion terminating at the first radius;
wherein the second outer strip comprises two or more longitudinally extending outer ridges, each of which extends along the longitudinally extending axis of the second outer strip in parallel to each other and in which the outer ridges of the second outer strip each comprise asymmetric ridges having a leading edge extending from the second radius and forming a contact portion and a non-contact trailing edge portion terminating at the second radius; and
wherein the leading edges of the first inner strip and the second outer strip are in contact with each other, and the non-contact trailing edge portions of the first inner strip and the second outer strip are spaced apart from each other.

2. A tubular article as claimed in claim 1, characterised in that the contact portion of the first inner strip comprises a portion extending at a first angle relative to the longitudinal axis of the first inner strip, and the trailing edge portion of the first inner strip extends at a second angle relative to the longitudinal axis of the first inner strip, and wherein the second angle is greater than the first angle said angle by 20 degrees or more.

3. A tubular article as claimed in claim 1, characterised in that the contact portion of the first inner strip comprises a portion extending at an angle of between 70 degrees to 110 degrees relative to the longitudinal axis of the first inner strip.

4. A tubular article as claimed in claim 1, characterised in that the contact portion of the first inner strip comprises a portion extending substantially perpendicular to the longitudinal axis of the first inner strip.

5. A tubular article as claimed in claim 1, characterised in that the trailing edge portion of the first inner strip extends at an angle of between 20 degrees and 70 degrees relative to the longitudinal axis of the first inner strip.

6. A tubular article as claimed in claim 1, characterised in that the trailing edge portion of the first inner strip extends at an angle of substantially 45 degrees to the longitudinal axis of the first inner strip.

7. A tubular article as claimed in claim 1, characterised in that the leading edges of the outer strip each face away from each other.

8. A tubular article as claimed in claim 1, characterised in that the leading edges of the inner strip each face towards each other.

9. A tubular article as claimed in claim 1, characterised in that the leading edges of the outer strip each face towards each other.

10. A tubular article as claimed in claim 1, characterised in that the leading edges of the inner strip each face away from each other.

11. A tubular article as claimed in claim 1, characterised by an inner gap between the first and second edges of the first inner strip.

12. A tubular article as claimed in claim 1, characterised by a gap between the first and second edges of the first inner strip.

13. A tubular article as claimed in claim 11, characterised in that the inner gap lies at a position between the outer ridges of the first inner strip.

14. A tubular article as claimed in claim 12, characterised in that the gap lies at a position between the inner ridges of the first inner strip.

15. A tubular article as claimed in claim 1, characterised by an inner core around which the first inner strip and the second outer strip are wound.

16. A tubular article as claimed in claim 15, characterised in that the first inner strip and the second outer strip have a natural radius of curvature less than a radius of an outer portion of the inner core.

17. A tubular article as claimed in claim 1, characterised in that the first inner strip and the second outer strip comprise material having a tensile strength of between 800 and 2000 GPa.

18. A tubular article as claimed in claim 1, characterised in that the first inner strip and the second outer strip are each wound at an angle to the longitudinal axis of the tubular article.

19. A tubular article as claimed in claim 18, characterised in that the angle is between 4 and 54 degrees.

20. A tubular article as claimed in claim 18, characterised in that the angle is between 4 and 12 degrees.

21. A tubular article as claimed in claim 18, characterised in that the angle is substantially 12 degrees.

22. A method of manufacturing the tubular article according to claim 1, characterised by the steps of forming the longitudinally extending inner and outer ridges, on each of the strips, each of said ridges being formed so as to extend along the longitudinally extending axis in parallel to each other and forming the ridges as asymmetric ridges having a leading edge forming a contact portion and wherein the strips are wound in spirally wound overlapping relationship such that the leading edges are each in contact with each other, and the trailing edge portions are wound so as to be distanced from each other.

23. A pair of tubular strips according to claim 1, said strips comprising a pair or longitudinally extending ridges, each of said ridges extending along said longitudinally extending axis in parallel to each other and in which said ridges each comprise asymmetric ridges having a leading edge and trailing edge portion, wherein said leading edges of said outer strip each face away from each other, said leading edges of said inner strip each face towards each other, or said leading edge of said outer strip each face towards each other and said leading edge of said inner strip each face away from each other, and wherein said leading edges are angled at an angle to cause contact therebetween when placed on top of each other, and said trailing edge portions are angled at an angle so as to create a gap therebetween when placed on top of each other.

\* \* \* \* \*